United States Patent [19]

Gardikes

[11] Patent Number: 4,590,229

[45] Date of Patent: May 20, 1986

[54] PHENOLIC RESIN-POLYISOCYANATE BINDER SYSTEMS

[75] Inventor: John J. Gardikes, Worthington, Ohio

[73] Assignee: Ashland Oil, Inc., Russell, Ky.

[21] Appl. No.: 617,231

[22] Filed: Jun. 4, 1984

[51] Int. Cl.$^4$ .............................................. B22C 11/22
[52] U.S. Cl. .................................. 523/143; 164/526; 523/145; 524/196; 524/484; 524/541
[58] Field of Search ...................... 523/142, 143, 145; 260/DIG. 40; 164/526; 524/196, 484, 541

[56] References Cited

U.S. PATENT DOCUMENTS

| | | | |
|---|---|---|---|
| 3,409,579 | 11/1968 | Robins | 523/143 |
| 3,429,848 | 2/1969 | Robins | 523/143 |
| 3,485,797 | 12/1969 | Robins | 526/71 |
| 3,676,392 | 7/1972 | Robins | 524/442 |
| 4,051,092 | 9/1977 | Holik et al. | 260/DIG. 40 |

*Primary Examiner*—Lorenzo B. Hayes
*Attorney, Agent, or Firm*—Pollock, Vande Sande & Priddy

[57] ABSTRACT

A binder composition containing a phenolic resin in an organic solvent, a polyisocyanate, wherein said organic solvent is substantially free from polar solvents, and methods of making and using the same.

18 Claims, No Drawings

PHENOLIC RESIN-POLYISOCYANATE BINDER SYSTEMS

DESCRIPTION

1. Technical Field

The present invention relates to binder compositions and methods for making, curing, and using such binder compositions. The binder compositions of the present invention are especially useful as molding compositions such as for making refractory and/or abrasive articles and for molding shapes such as cores and molds. The preferred binder compositions of the present invention are especially useful in obtaining foundry shapes. The binder compositions are capable of being cured at room temperature by a basic curing agent.

2. Background of Invention

U.S. Pat. Nos. 3,409,579 and 3,676,392 disclose binder compositions made available as two-package systems comprising a resin component in one package and a hardener component in the other package. The entire contents of each of these two U.S. patents are incorporated herein by reference. The resin component comprises an organic solvent solution of phenolic resin. The hardener component comprises a liquid polyisocyanate having at least two isocyanate groups per molecule. At the time of use the contents of the two packages may be combined first and then mixed with the sand aggregate or preferably, the packages are sequentially admixed with sand aggregate. After a uniform distribution of the binder on the sand particles has been obtained, the resulting foundry mix is molded into the desired shape.

In U.S. Pat. No. 3,409,579 the molded shape is cured by passing a gaseous tertiary amine through it. In U.S. Pat. No. 3,676,392 curing is effected by means of a base having a pKb value in the range of about 7 to about 11 as determined by a method described by D. D. Perrin in Dissociation Constants of Organic Bases in Aqueous Solution (Butterworths, London 1965). The base is introduced originally into the resin component before it is mixed with hardener or it may be introduced as the third component of a three-package binder system comprising, in separate packages, the resin component, the hardener, and the base.

In both U.S. Pat. Nos. 3,409,579 and 3,676,392 the preferred phenolic resins are condensation products of a phenol having the general formula:

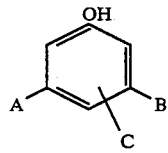

wherein A, B, and C are hydrogen, hydrocarbon radicals, oxyhydrocarbon radicals, or halogen with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins are disclosed in greater detail in U.S. Pat. No. 3,485,797, the entire contents of which is incorporated herein by reference. The phenolic resin component of the binder composition is, as indicated above, generally employed as a solution in an organic solvent.

The second component, or package, of the binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g., a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate and aromatic polyisocyanates such as 2,4- and 2,6-toluene diisocyanate, diphenylmethane diisocyanate, and dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. Although all polyisocyanates react with the phenolic resin to form a cross-linked polymer structure, the preferred polyisocyanates are aromatic polyisocyanates and particularly, polymethylene polyphenyl isocyanates such as diphenylmethane diisocyanate.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

U.S. Pat. Nos. 3,409,579 and 3,676,392 state that the difference in polarity between the polyisocyanate and phenolic resins restricts the choice of solvents in which both components are compatible. This compatibility is necessary to achieve complete reaction and curing of the binder compositions. Polar solvents of either the protic or aprotic type are taught as good solvents for the phenolic resins. Aromatic solvents, although compatible with the polyisocyanates, are taught as being less compatible with phenolic resins.

Accordingly, the preferred solvent systems of the prior art are combinations of polar solvents and aromatic solvents. In fact, a number of U.S. patents concerned with the systems of the type disclosed in U.S. Pat. Nos. 3,409,579 and 3,676,392 are directed to specific polar solvent additives. Such patents include U.S. Pat. Nos. 4,273,179; 3,905,937; and 4,246,157.

DISCLOSURE OF THE INVENTION

The present invention is concerned with a binder composition which comprises a resin component and a hardener component. The composition is cured by contacting it with a basic catalyst for the hardening or cross-linking reaction. The curing catalyst is preferably a gaseous tertiary amine or a base having a pKb value of about 7 to about 11.

The resin component includes a solution of a non-aqueous phenolic resin in an organic solvent. The phenol resin comprises a condensation product of a phenol with an aldehyde. The phenol has the formula:

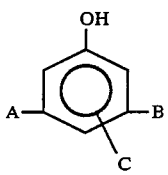

wherein A, B, and C are hydrogen, or hydrocarbon radicals, or oxyhydrocarbon radicals, or halogen. At least about 5 mole percent of the phenol and preferably about 10–50 mole percent of the phenol is an alkyl substituted phenol and preferably an alkyl containing 1 to 26 carbon atoms.

The aldehyde has the formula R'CHO wherein R' is a hydrogen or hydrocarbon radical of 1 to 8 carbon atoms.

It has been found, in accordance with the present invention, that when the phenol resin is from a phenol constituent containing at least 1 mole percent of an alkyl phenol, contrary to the prior art teachings, it is not necessary to employ a polar solvent in the solvent combination. The solvent component of the resin component is substantially free from polar solvents.

The hardener component comprises liquid polyisocyanate containing at least two isocyanate groups per molecule.

The present invention is also concerned with molding compositions which comprise a major amount of aggregate and an effective bonding amount of up to about 40% by weight of the binder composition described hereinabove based on the weight of the aggregate.

Moreover, the present invention is concerned with fabricating foundry shapes which comprises mixing foundry aggregate with a bonding amount of up to about 10% by weight of the binder composition described hereinabove based upon the weight of the aggregate. The foundry mix is introduced in a pattern and hardened to become self-supporting. The shaped foundry mix is removed from the pattern and allowed to further cure to thereby obtain a hard, solid, cured foundry shape.

Furthermore, the present invention is concerned with a process for casting a metal. The process comprises fabricating a foundry shape as discussed hereinabove and pouring the metal while in the liquid or molten state into or around the shape. The metal is allowed to cool and solidify and the molded metal article is then separated from the foundry shape.

BEST AND VARIOUS MODES FOR CARRYING OUT THE INVENTION

The binder compositions used in the invention contain certain phenolic resins and polyisocyanate combinations. Such phenolic-isocyanate binder systems are admixed at or about the time of use in the presence of sand. Typically, the reactive ingredients of such binder compositions are sold, shipped, and stored in separate packages (i.e., a multiple package core binder) to avoid undesirable deterioration due to premature reaction between the components. Catalysts, various additives, and other known binders can optionally be used in conjunction with the phenolic resin and the isocyanate.

The phenol content of the phenolic resins employed include at least 1 mole percent, preferably at least about 5 mole percent, and up to 100 mole percent, more preferably about 5 to about 80 mole percent of an alkyl phenol, and most preferably, about 5 to about 50 mole percent of an alkyl phenol.

The alkyl group preferably contains 1 to 26 carbon atoms and, most preferably, 1 to 12 carbon atoms. Examples of suitable alkyl substituted phenols include 2,6 xylenol, o-cresol, m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-octyl phenol, dodecyl phenol, and nonyl phenols such as paranonyl phenol. The preferred alkyl substituted phenols include the cresols and the nonyl phenols and, most preferably, o-cresol and p-nonyl phenol. Mixtures of alkyl phenols can be used, if desired.

The phenolic resins are substantially free of water and are organic solvent soluble. In addition to containing at least one alkyl phenol, the phenolic component includes any one or more of the phenols which have heretofore been employed in the formation of phenolic resins and which are not substituted at either the two ortho- positions or at one ortho- and the para- position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para- positions. Substituted phenols employed in the formation of the phenolic resins include aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols, in addition to the alkyl phenols, include phenol, cyclohexyl phenol, 3,5-dicyclohexyl phenol, p-phenyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the general formula:

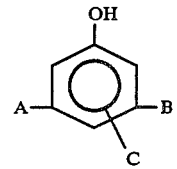

wherein A, B, and C are hydrogen, hydrocarbon radicals, oxyhydrocarbon radicals, or halogen. The preferred phenol component employed is a mixture of one or more of these phenols with the alkyl phenols.

The phenol component is preferably reacted with an aldehyde to form phenolic resins, more preferably, benzylic either resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde in its aqueous forms or in the paraformaldehyde form.

If desired, the reaction mass for the preparation of the phenolic resins can include other reactants such as difunctional phenolic materials including resorcinol, hydroquinone, and the bisphenols (e.g., bisphenol A, bisphenol C, and bisphenol F).

The phenolic resins employed in the binder compositions can be either resole or A-stage resins or novolak resins. The resitole or B-stage resins, which are a more highly polymerized form of resole resins, are generally unsuitable. The phenolic resin employed must be liquid or organic solvent-soluble. Solubility in organic solvent is desirable to achieve uniform distribution of the binder on the aggregate. The substantial absence of water in the phenolic resin is desirable in view of the reactivity with water of the binder composition of the present invention. The term "non-aqueous" or substantially water-free, as employed herein, is meant to define a phenolic resin which contains less than 5 percent water and preferably less than 1 percent water based on the weight of the resin. Mixtures of phenolic resins can be used.

Both the resole resins and the novolak resins can be employed in the binder compositions of the present invention and, when admixed with polyisocyanates and a foundry aggregate and cured by use of catalysts, form cores of sufficient strength and other properties to be suitable in industrial applications. The resole resins are preferred over the novolak resins. The preparation of resole resins is known in the art and, for that reason, is not specifically referred to herein.

By "phenolic resin" is meant the reaction products of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents and/or other ingredients present, and so forth). The reaction products, that is, the phenolic resin, will be a mixture of different molecules and may contain, in widely varying ratios, addition products, condensation products, and unreacted reactants such as unreacted phenol and/or unreacted aldehyde. By "addition product" is meant reaction products in which an organic group has been substituted for at least one hydrogen of a previously unreacted phenol or of a condensation product. By "condensation product" is meant reaction products with two or more benzene rings.

The phenolic resin component of the binder composition is employed as a solution in an organic solvent. The nature and the effect of the solvent will be more specifically described below. The amount of solvent used should be sufficient to result in a binder composition permitting uniform coating thereof on the aggregate and uniform reaction of the mixture. The specific solvent concentrations for the phenolic resins will vary depending on the type of phenolic resins employed and its molecular weight. In general, the solvent concentration will be in the range of up to 80 percent by weight of the resin solution and preferably in the range of 20 to 80 percent. It is preferred to keep the viscosity of the phenolic component at less than X-1 on the Gardner-Holt Scale.

The solvent constituent of the resin component is substantially free from polar solvents. "Substantially free from polar solvents" means a maximum of 1.5 percent by weight of polar solvent based upon the weight of the phenolic resin. Preferably, the solvent contains 0 to 1% by weight of a polar solvent based upon the weight of the phenolic resin. Most preferably, the solvent is entirely free from polar solvents.

The solvents employed preferably have flash points of at least 100° F. The solvents employed are usually aromatic hydrocarbon solvents with or without the addition of aliphatic hydrocarbon solvents. Preferably, the solvents for the phenolic contain at least about 80 percent by weight aromatics.

Suitable aromatic solvents are naphthalenes, alkyl substituted naphthalenes, alkyl substituted benzenes, and mixtures thereof. The most preferred aromatic solvents are mixed solvents that have an aromatic content of at least 85 percent and a boiling point range of 280° F. to 450° F.

Suitable aliphatic solvents are kerosene, mineral spirits, 140 solvent from Ashland, and low odor base solvents from Ashland.

Accordingly, the present invention makes it possible to exclude the more expensive polar solvents without a concomitant loss in compatibility as required.

The second component, or package, of the binder composition comprises an aliphatic, cycloaliphatic, or aromatic polyisocyanate having preferably from 2 to 5 isocyanate groups. If desired, mixtures of organic polyisocyanates can be employed. Suitable polyisocyanates include the aliphatic polyisocyanates such as hexamethylene diisocyanate, alicyclic polyisocyanates such as 4,4'-dicyclohexylmethane diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. Mixtures of isocyanates can be used. Although all polyisocyanates react with the phenolic resin to form a cross-linked polymer structure, the preferred polysiocyanates are aromatic polyisocyanates and particularly polymethylene polyphenyl polyisocyanates such as diphenylmethane diisocyanate.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80 percent by weight of the solution. Most preferably, the isocyanate is employed in a stoichiometric amount ±about 20 percent based on the available hydroxyl groups of the phenolic resin.

The solvent employed for the polyisocyanate is at least about 50 percent by weight aromatic and, preferably, also substantially free from polar solvents. Mixtures of aromatic and aliphatic solvents are usually employed.

The binder compositions are preferably to be made available as a two-package system with the solution of the phenolic resin in one package and the isocyanate component in the other package. The binder components can be combined and then admixed with sand or a similar aggregate to form the molding mix or the mix can also be formed by sequentially admixing the components with the aggregate. Methods of distributing the binder on the aggregate particles are well-known to those skilled in the art. The mix can, optionally, contain other ingredients such as iron oxide, ground flax fibers, wood cereals, pitch, refractory flours, and the like.

When preparing an ordinary sand-type foundry shape, the aggregate employed has a particle size large enough to provide sufficient porosity in the foundry shape to permit escape of volatiles from the shape during the casting operation. The term "ordinary sand type foundry shapes", as used herein, refers to foundry shapes which have sufficient porosity to permit escape of volatiles from it during the casting operation. Generally, at least about 80 percent and preferably about 90 percent by weight of aggregate employed for foundry shapes has an average particle size no larger than about 50 mesh (Tyler Screen Mesh). The aggregate for foundry shapes preferably has an average particle size between about 50 and about 150 mesh (Tyler Screen Mesh).

The preferred aggregate employed for ordinary foundry shapes is sand wherein at least about 70 weight percent and preferably at least about 85 weight percent of the sand is silica. Other suitable aggregate materials include zircon, olivine, aluminosilicate sand, chromite sand and the like.

When preparing a shape for precision casting, the predominant portion and generally at least about 80 percent of the aggregate has an average particle size no larger than 150 mesh (Tyler Screen Mesh) and preferably between about 325 mesh and 200 mesh (Tyler Screen Mesh). Preferably, at least about 90 percent by weight of the aggregate for precision casting applications are fused quartz, zircon sands, magnesium silicate sands such as olivine, and aluminosilicate sands.

When preparing a refractory such as a ceramic, the predominant portion and at least 80 weight percent of the aggregate employed has an average particle size under 200 mesh and preferably larger than 325 mesh. Preferably, at least about 90 percent by weight of the aggregate for a refractory has an average particle size under 200 mesh and preferably larger than 325 mesh. The aggregate employed in the preparation of refractories must be capable of withstanding the curing temperatures such as above about 1500° F. which are needed to cause sintering for utilization. Examples of some suitable aggregates employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and the ceramics.

Examples of some abrasive grains for preparing abrasive articles include aluminum oxide, silicon carbide, boron carbide, corundum, garnet, emery and mixtures thereof. The grit size is of the usual grades as graded by the U.S. Bureau of Standards. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85 percent of the inorganic filler has an average particle size no greater than 200 mesh. It is most preferred that at least about 95 percent of the inorganic filler has an average particle size no greater than 200 mesh. Some inorganic fillers include cryolite, fluorospar, silica, and the like. When an inorganic filler is employed, along with the abrasive grit, it is generally present in amounts from about 1 to about 30 percent by weight based upon the combined weight of the abrasive grit and inorganic filler.

Although the aggregate employed is preferably dry, it can contain small amounts of moisture, such as up to about 1 percent by weight or even higher based on the weight of the aggregate.

In molding compositions, the aggregate constitutes the major constituent and the binder constitutes a relatively minor amount. In ordinary sand type foundry applications, the amount of binder is generally no greater than about 10 percent by weight and frequently within the range of about 0.5 to about 7 percent by weight based upon the weight of the aggregate. Most often, the binder content ranges from about 0.6 to about 5 percent by weight based upon the weight of the aggregate in ordinary sand type foundry shapes.

In molds and cores for precision casting applications, the amount of binder is generally no greater than about 40 percent by weight and frequently within the range of about 5 to about 20 percent by weight based upon the weight of the aggregate.

In refractories, the amount of binder is generally no greater than about 40 percent by weight and frequently within the range of about 5 percent to about 20 percent by weight based upon the weight of the aggregate.

In abrasive articles, the amount of binder is generally no greater than about 25 percent by weight and frequently within the range of about 5 percent to about 15 percent by weight based upon the weight of the abrasive material or grit.

Although the aggregate employed is preferably dry, moisture of up to about 1 weight percent based on the weight of the aggregate can be tolerated. This is particularly true if the solvent employed is non-water-miscible or if an excess of the polyisocyanate necessary for curing is employed since such excess polyisocyanate will react with the water.

The molding is molded into the desired shape, whereupon it can be cured so as to retain this shape upon removal from the mold. Curing can be affected by passing a tertiary amine, such as triethylamine or dimethylethyl amine, through the molded mix as described in U.S. Pat. No. 3,409,579.

A valuable additive to the binder compositions of the present invention in certain types of sand is a silane such as those having the general formula:

wherein R' is a hydrocarbon radical and preferably an alkyl radical of 1 to 6 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.1 to 2 percent by weight based on weight of the phenolic binder and hardener, improves the humidity resistance of the systems. Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta (aminoethyl)-gamma-amino-propyltrimethoxy silane); and Union Carbide A-1160 (Ureido-silane).

Other valuable additives include wetting agents; bench life additives; and internal release agents such as fatty acids, fatty alcohols and/or derivatives of these materials, and silicone materials such as dimethyl-, methylphenyl-, and diphenylpolysiloxanes. A suitable fatty acid is sylfat 96 (from Sylvachem Corp.) which is based on oleic and linoeic acids.

In order to further understand the present invention, the following non-limiting examples concerned with foundry shapes are provided. All parts are by weight, unless the contrary is stated. In all examples, the tensile strength samples are cured by the so-called "cold-box" process by contacting with dimethylethylamine.

The following Examples 1-4 are typical procedures which can be employed to prepare resole type polymers suitable for use in accordance with the present invention.

EXAMPLE 1

Charge about 1193.75 grams of phenol, about 587.5 grams of o-cresol, about 717.75 grams of 91 percent paraformaldehyde, and about 1 gram of zinc acetate dihydrate to a reaction vessel provided with a stirrer, thermometer, and condenser. Instead of the zinc acetate catalyst, other metal catalysts as disclosed in U.S. Pat. No. 3,485,797 such as lead soaps of $C_9$–$C_{12}$ monocarboxylic acids; lead naphthenate and lead octoate may be employed. Heat the reaction mass up to about 108° C. to about 110° C. Hold at that temperature for about 30 minutes. Heat to about 114° C. to about 116° C. and hold at that temperature until the free formaldehyde is less than about 8 percent. This usually takes about one and one-half hours.

Heat under atmospheric dehydration conditions to about 125° C. until substantially all of the free formaldehyde has reacted (less than about 1 percent free formaldehyde). This usually takes about one to one and one-half hours. Then dehydrate under vacuum of 27" of Hg for about 10 minutes to obtain the desired product containing about 30 mole percent of o-cresol based upon the total phenol.

EXAMPLE 2

Charge about 858.15 grams of phenol, about 223.25 grams of nonyl phenol containing at least about 90 percent by weight of paranonyl phenol, about 418.05 grams of 91 percent paraformaldehyde, and about 0.6 grams of zinc acetate to a reaction vessel provided with a stirrer, thermometer, and condenser. Instead of the zinc acetate catalyst, other metal catalysts as disclosed in U.S. Pat. No. 3,485,797 such as lead soaps of $C_9$–$C_{12}$ monocarboxylic acids; lead naphthenate, and lead octoate may be employed. Heat the reaction mass up to about 112° C. to about 114° C. Hold at that temperature under reflux condition until the free formaldehyde is less than about 8%. This usually takes about one and one-half hours.

Heat under atmospheric dehydration conditions to about 125° C. until substantially all of the free formaldehyde has reacted (less than about 1% free formaldehyde). Then dehydrate under vacuum of 27" of Hg for about 10 minutes to obtain the desired product containing about 10 moles of nonyl phenol based upon the total phenol.

EXAMPLE 3

Charge about 957 grams of phenol, about 117.9 grams of nonyl phenol containing at least about 90 percent by weight of paranonyl phenol, about 424.2 grams of 91 percent paraformaldehyde, and about 0.9 grams of zinc acetate to a reaction vessel provided with a stirrer, thermometer, and condenser. Instead of the zinc acetate catalyst, other metal catalysts as disclosed in U.S. Pat. No. 3,485,797 such as lead soaps of $C_9$–$C_{12}$ monocarboxylic acids; lead naphthenate, and lead octoate may be employed. Heat the reaction mass up to about 112° C. to about 114° C. Hold at that temperature under reflux condition until the free formaldehyde is less than about 8%. This usually takes about one and one-half hours.

Heat under atmospheric dehydration conditions to about 125° C. until substantially all of the free formaldehyde has reacted (less than about 1% free formaldehyde). Then dehydrate under vacuum of 27" of Hg for about 10 minutes to obtain the desired product containing about 5 mole percent of nonyl phenol based upon the total phenol.

EXAMPLE 4

Charge about 1378.25 grams of phenol, about 398.75 grams of o-cresol, about 725 grams of 91 percent paraformaldehyde, and about 1 grams of zinc. acetate dihydrate to a reaction vessel provided with a stirrer, thermometer, and condenser. Instead of the zinc acetate catalyst, other metal catalysts as disclosed in U.S. Pat. No. 3,485,797 such as lead soaps of $C_9$–$C_{12}$ monocarboxylic acids; lead naphthenate and lead octoate may be employed. Heat the reaction mass up to about 108° C. to about 110° C. Hold at that temperature for about 30 minutes. Heat to about 114° C. to about 116° C. and hold at that temperature until the free formaldehyde is less than about 8 percent. This usually takes about one and one-half hours.

Heat under atmospheric dehydration conditions to about 125° C. until substantially all of the free formaldehyde has reacted (less than about 1 percent free formaldehyde). This usually takes about one to one and one-half hours. Then dehydrate under vacuum of 27" of Hg for about 10 minutes to obtain the desired product containing about 20 mole percent of o-cresol based upon the total phenol.

EXAMPLE 5

100 parts by weight of Manley 1L-5W sand are admixed for about 2 minutes with about 0.825 parts of a phenolic resin composition containing about 54 percent by weight of a phenolic resin prepared along the lines of Example 1; about 8 percent of HiSol 15 (an aromatic solvent available from Ashland Chemical Company and having a boiling point range of 182° C. to 204° C.); about 30 percent of HiSol 4-3N (an aromatic solvent containing 99 percent aromatic and remainder aliphatic); about 5 percent of HiSol 4-2L (an aromatic solvent containing at least 75 percent by weight aromatic and remainder aliphatic); about 2 percent by weight of kerosene and about 1 percent by weight of a release agent (Emerez 2381, solid monoester of stearic acid and propylene glycol). To the said mixture are admixed for about 2 minutes, about 0.675 parts of isocyanate composition containing 76 parts by weight of Mondur MR (an aromatic polyisocyanate based on polymethylene polyphenyl isocyanate) from Mobay, about 8.6 parts by weight of Texaco 7545 solvent (an aromatic solvent having an initial boiling point (IBP) of about 440° F., 10 percent at about 490° F., 50 percent at about 510° F., 90 percent at about 600° F., and dry end point of about 700° F.); about 8 parts of HiSol 15, about 5.8 parts of kerosene, and about 1.6 parts of a bench life extender (a 75 percent solution of phenyl phosphonic acid in butanol). The resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition is about 182 psi, and the average 24 hour tensile strength is about 283 psi. Upon casting of metal, cured samples exhibit acceptable smoke emission and shake out.

EXAMPLE 6

100 parts by weight of Manley 1L-5W sand are admixed for about 2 minutes with about 0.825 parts of a phenolic resin composition containing about 55 percent by weight of a phenolic resin prepared along the lines of Example 2; about 36 percent of HiSol 4-3N (an aromatic solvent containing 99 percent aromatic and remainder aliphatic); about 8 percent by weight of kerosene; and about 1 percent by weight of a release agent (Emerez 2381, solid monoester of stearic acid and propylene glycol). To the said mixture are admixed for about 2 minutes, about 0.675 parts of isocyanate composition containing 75 parts by weight of Mondur MR (an aromatic polyisocyanate based on polymethylene polyphenyl isocyanate) from Mobay, about 17.4 parts of HiSol 15, about 5.8 parts of kerosene, about 1.2 parts of a bench life extender (a 75 percent solution of phenyl phosphonic acid in butanol), and about 0.6 parts phthaloyl chloride. The resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition is about 175 psi, the average 1 hour tensile strength is about 230 psi and the average 24 hour tensile strength is about 285 psi.

EXAMPLE 7

100 parts by weight of Manley 1L-5W sand are admixed for about 2 minutes with about 0.825 parts of a phenolic resin composition containing about 54 percent by weight of a phenolic resin prepared along the lines of Example 2; about 34 percent of HiSol 4-3N (an aromatic solvent containing 99 percent aromatic and remainder aliphatic); about 10 percent by weight of kerosene; and about 1 percent by weight of a release agent (Emerez 2381, solid monoester of stearic acid and propylene glycol). To the said mixture are admixed for about 2 minutes, about 0.675 parts of isocyanate composition containing 75 parts by weight of Mondur MR (an aromatic polyisocyanate based on polymethylene polyphenyl isocyanate) from Mobay, about 17.4 parts of HiSol 15, about 5.8 parts of kerosene, about 1.2 parts of a bench life extender (a 75 percent solution of phenyl phosphonic acid in butanol), and about 0.6 parts phthaloyl chloride. The resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition is about 183 psi, the average 1 hour tensile strength is about 247 psi and the average 24 hour tensile strength is about 283 psi.

EXAMPLE 8

100 parts by weight of Manley 1L-5W sand are admixed for about 2 minutes with about 0.825 parts of a phenolic resin composition containing about 54 percent by weight of a phenolic resin prepared along the lines of Example 2; about 36 percent of Texaco 7545; about 8 percent by weight of kerosene; and about 1 percent by weight of a release agent (Emerez 2381, solid monoester of stearic acid and propylene glycol). To the said mixture are admixed for about 2 minutes, about 0.675 parts of isocyanate composition containing 75 parts by weight of Mondur MR (an aromatic polyisocyanate based on polymethylene polyphenyl isocyanate) from Mobay, about 17.4 parts of HiSol 15, about 5.8 parts of kerosene, about 1.2 parts of a bench life extender (a 75 percent solution of phenyl phosphonic acid in butanol), and about 0.6 parts phthaloyl chloride. The resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition is about 162 psi, the average 1 hour tensile strength is about 215 psi and the average 24 hour tensile strength is about 308 psi.

EXAMPLE 9

100 parts by weight of Manley 1L-5W sand are admixed for about 2 minutes with about 0.825 parts of a phenolic resin composition containing about 54 percent by weight of a phenolic resin prepared along the lines of Example 1; about 38 percent of HiSol 4-3N (an aromatic solvent containing 99 percent aromatic and remainder aliphatic); about 7 percent by weight of kerosene; and about 1 percent by weight of a release agent (Emerez 2381, solid monoester of stearic acid and propylene glycol). To the said mixture are admixed for about 2 minutes, about 0.675 parts of isocyanate composition containing 76 parts by weight of Mondur MR (an aromatic polyisocyanate based on polymethylene polyphenyl isocyanate) from Mobay, about 8 parts of HiSol 15, about 5.8 parts of kerosene, about 8.3 parts of HiSol 4-3N, about 1.3 parts of a bench life extender (a 75 percent solution of phenyl phosphonic acid in butanol), and about 0.6 parts phthaloyl chloride. The resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition is about 180 psi, the average 1 hour tensile strength is about 262 psi and the average 24 hour tensile strength is about 255 psi.

EXAMPLE 10

100 parts by weight of Manley 1L-5W sand are admixed for about 2 minutes with about 0.825 parts of a phenolic resin composition containing about 54 percent by weight of a phenolic resin prepared along the lines of Example 4; about 8 percent of HiSol 15 (an aromatic solvent available from Ashland Chemical Company and having a boiling point range of 182° C. to 204° C.); about 30 percent of HiSol 4-3N (an aromatic solvent containing 99 percent aromatic and remainder aliphatic); about 5 percent of HiSol 4-2L (an aromatic solvent containing at least 75 percent by weight aromatic and remainder aliphatic); about 2 percent by weight of kerosene; and about 1 percent by weight of a release agent (Emerez 2381, solid monoester of stearic acid and propylene glycol). To the said mixture are admixed for about 2 minutes, about 0.675 parts of isocyanate composition containing 76 parts by weight of Mondur MR (an aromatic polyisocyanate based on polymethylene polyphenyl isocyanate) from Mobay, about 6 parts by weight of HiSol 4-3N, about 8 parts of HiSol 15, about 5.8 parts of kerosene, about 1.6 parts of a bench life extender (a 75 percent solution of phenyl phosphonic acid in butanol), and about 0.6 parts phthaloyl chloride. The resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition is about 150 psi, the average 1 hour tensile strength is about 220 psi, and the average 24 hour tensile strength is about 230 psi.

EXAMPLE 11

100 parts by weight of Manley 1L-5W sand are admixed for about 2 minutes with about 0.825 parts of a phenolic resin composition containing about 54 percent by weight of a phenolic resin prepared along the lines of Example 3; about 8 percent of HiSol 15 (an aromatic solvent available from Ashland Chemical Company and having a boiling point range of 182° C. to 204° C.); about 30 percent of HiSol 4-3N (an aromatic solvent containing 99 percent aromatic and remainder aliphatic); about 5 perqent of HiSol 4-2L (an aromatic solvent containing at least 75 percent by weight aromatic and remainder aliphatic); about 2 percent by weight of kerosene; and about 1 percent by weight of a release agent (Emerez 2381, solid monoester of stearic acid and propylene glycol). To the said mixture are admixed for about 2 minutes, about 0.675 parts of isocyanate composition containing 76 parts by weight of Mondur MR (an aromatic polyisocyanate based on polymethylene polyphenyl isocyanate) from Mobay, about 8.6 parts by weight of Texaco 7545 solvent (an aromatic solvent having an initial boiling point (IBP) of about 440° F., 10 percent at about 490° F., 50 percent at about 510° F., 90 percent at about 600° F., and dry end point of about 700° F.); about 8 parts of HiSol 15, about 5.8 parts of kerosene, and about 1.6 parts of a bench life extender (a 75 percent solution of phenyl phosphonic acid in butanol). The resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition is about 137 psi, the average 1 hour tensile strength is about 223 psi, and the average 24 hour tensile strength is about 237 psi.

What is claimed is:

1. A binder composition comprising, in admixture, a resin component, a hardener component, and a curing component; said resin component including a solution of a non-aqueous phenolic resin in an organic solvent wherein said resin which comprises a condensation product of a phenol having the general formula:

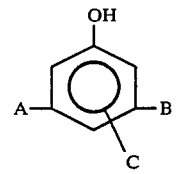

wherein A, B, and C are hydrogen, hydrocarbon radicals, or halogen, wherein at least about 1 mole percent of said phenol is an alkyl substituted phenol with an aldehyde having the general formula R'CHO wherein R' is a hydrogen or a hydrocarbon radical of 1 to 8 carbon atoms and wherein said organic solvent is substantially free from polar solvents, and is at least about 80 percent by weight of aromatic hydrocarbons; said hardener component comprises liquid polyisocyanate containing at least two isocyanate groups.

2. The composition of claim 1 wherein said organic solvent contains up to 1 percent by weight of a polar solvent based upon the weight of the phenolic resin.

3. The composition of claim 1 wherein said organic solvent is entirely free from polar solvents.

4. The composition of claim 1 wherein said solvent has a flash point of at least about 100° F.

5. The composition of claim 1 in which the alkyl group of the alkyl phenol contains 1 to 26 carbon atoms.

6. The composition of claim 1 in which the alkyl group of said alkyl phenol contains 1 to 12 carbon atoms.

7. The composition of claim 1 wherein said alkyl phenol includes o-cresol.

8. The composition of claim 1 wherein said alkyl phenol includes nonyl phenol.

9. The composition of claim 1 wherein said alkyl phenol includes dodecyl phenol.

10. The composition of claim 1 wherein the amount of the alkyl phenol is about 5 to about 80 mole percent of the phenol.

11. The composition of claim 1 wherein said composition is cured by an amine gas.

12. A molding composition which comprises:
 a. a major amount of aggregate; and
 b. an effective bonding amount up to about 40 percent by weight of the aggregate of the binder composition of claim 1.

13. The composition of claim 12 wherein the amount of said binder composition is about 0.6 to about 5 percent based upon the weight of the aggregate.

14. The binder composition of claim 1 which further includes a silane.

15. The binder composition of claim 1 which further includes a base.

16. The composition of claim 1 wherein said phenolic resin contains less than 1 percent water.

17. The composition of claim 1 wherein the amount of the alkyl phenol is at least about 5 mole percent of the phenol.

18. The composition of claim 1 wherein the amount of the alkyl phenol is about 10-50 mole percent of the phenol.

* * * * *